United States Patent

[11] 3,601,276

[72] Inventor Edward R. Culpepper
 1028 Pennsylvania Ave., Suffolk, Va. 23434
[21] Appl. No. 880,055
[22] Filed Nov. 26, 1969
[45] Patented Aug. 24, 1971

[54] PROTECTIVE COVER FOR ELECTRICAL RECEPTACLE BOXES
 8 Claims, 4 Drawing Figs.

[52] U.S. Cl. .................................................. 220/3.8
[51] Int. Cl. .................................................. H02g 3/14
[50] Field of Search ..................................... 220/3.4, 3.8

[56] References Cited
UNITED STATES PATENTS

| | | | |
|---|---|---|---|
| 1,956,196 | 4/1934 | Korab | 220/3.4 |
| 2,815,144 | 12/1957 | Kullander | 220/3.4 |
| 3,059,803 | 10/1962 | Holsinger | 220/3.4 |
| 3,061,083 | 10/1962 | Hobbell | 220/3.4 X |

Primary Examiner—M. Henson Wood, Jr.
Assistant Examiner—Gene A. Church
Attorney—Mason, Fenwick & Lawrence ABSTRACT: A removable protective cover for an electrical receptacle box or switch box in a building wall to protect the box against entry of plaster during plastering of the building wall, wherein the cover is formed as an integral body of deformable sheet material having a rectangular panel portion for covering the front opening of the box with its lateral edges fitting within the opening, and including extensions which cover the conventional mounting ears of the receptacle box and have bendable fastening means for fastening the cover to such mounting ears.

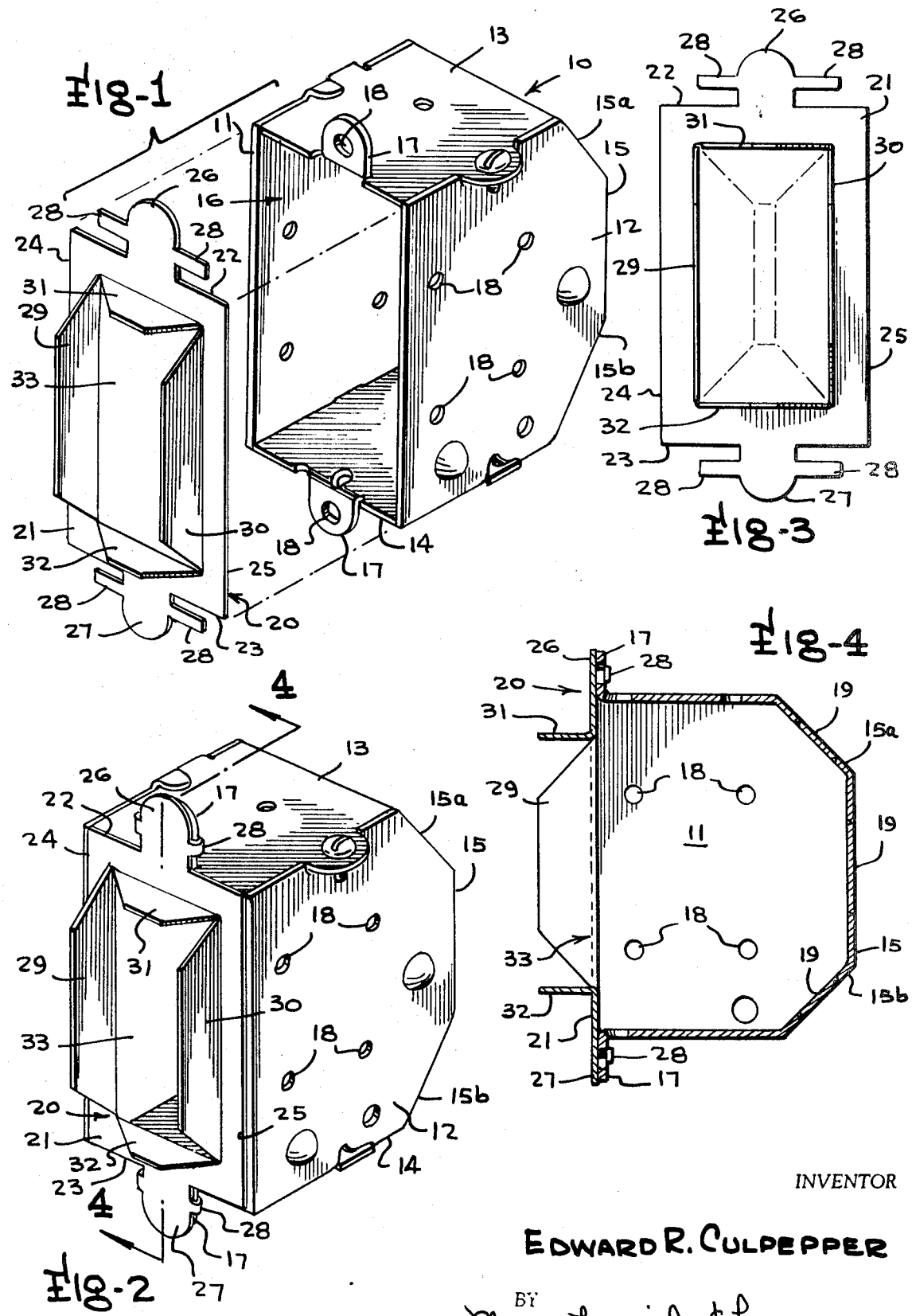

PROTECTIVE COVER FOR ELECTRICAL RECEPTACLE BOXES

BACKGROUND AND OBJECTS OF THE INVENTION

The present invention relates to removable protective covers for electrical receptacle boxes and switch boxes in building walls to protect such boxes against entry of plaster during plastering of the building walls, and which may be removed after plastering is completed without cracking the plaster adjacent the receptacle boxes.

Heretofore, a very troublesome problem in building construction has been the difficulty of preventing accumulating substantial quantities of plaster in electrical receptacle boxes and switch boxes mounted in the building wall prior to plastering and preventing plasterers from carelessly plastering over open receptacle boxes. As is well known, after the rough walls are erected, for example the stud walls and the outer shell walls in residential dwellings, the plumbing and electrical subcontractors come in and install the rough plumbing and the wiring and electrical receptacle and switch boxes. For convenience, I will hereafter refer to such boxes as electrical receptacle boxes, although it will be understood that the term should also be extended to boxes to which electrical switches are mounted as well as to boxes which support and house the wiring connections for electric light fixtures. When such receptacle boxes are installed prior to plastering, the boxes are all forwardly opening and have the wire ends for the wiring to the boxes located in the boxes in exposed condition. The plasterers then come in and plaster the walls and ceiling, troweling up to and around the edges of the open fronts of the receptacle boxes. Inevitably, troweling to the edges of the boxes causes the plaster to spill into the boxes and in many cases the plasterer's trowel plaster over the boxes and entirely covers them. The presence of plaster in the boxes is a source of great annoyance and considerable time loss to the electrician when he comes back on the job to connect up the electrical receptacles, switches and like fixtures to the wiring in the boxes. Also, if the plasterer has plastered over the open front of the box, entirely covering the box, the box is difficult to locate and when the electrician attempts to break the plaster out of the box, frequently the plaster adjacent the box is damaged because of ragged edges produced in breaking away the plaster layer covering the box.

An object of the present invention, therefore, is the provision of a simple and inexpensive removable protective cover which can be readily fitted over open electrical receptacle boxes installed in building walls during building construction prior to plastering, which allows the plasterer to work up to the receptacle box without getting plaster inside the box, and thereby minimizes accumulation of plaster in the receptacle box during the plastering stage.

Another object of the present invention is the provision of a removable protective cover as described in the preceding paragraph, which is so constructed that it can be readily removed from the receptacle box by the electrician after the plastering has been completed without damaging the plaster.

Other objects, advantages and capabilities of the present invention will become apparent from the following detailed description, taken in conjunction with the accompanying drawing illustrating a preferred embodiment of the invention.

BRIEF DESCRIPTION OF THE FIGURES

FIG. 1 is an exploded perspective view of a typical electrical receptacle box and the removable protective cover of the present invention;

FIG. 2 is a perspective view of the receptacle box with the removable protective cover assembled thereon;

FIG. 3 is a front elevation view of the receptacle cover; and

FIG. 4 is a vertical section view of the removable protective cover assembled on a receptacle box, taken along the line 4—4 of FIG. 2.

DETAILED DESCRIPTION OF A PREFERRED EMBODIMENT

Referring to the drawings, wherein like reference characters designate corresponding parts throughout the several figures, there is illustrated a typical electrical receptacle box, indicated by the reference character 10, having vertical sidewalls 11, 12, top walls 13, bottom wall 14, and rear wall 15 having inclined forwardly diverging upper and lower sections 15a, 15b, all collectively defining a forwardly opening cavity 16. The forwardmost edges of the sidewalls 11, 12 and top and bottom walls 13, 14 define a rectangular frame surrounding the opening of the forwardly opening cavity 16 with the edges of the top and bottom walls 13, 14 rearwardly displaced slightly from the common plane of the forwardmost edges of sidewalls 11, 12.

Projecting respectively upwardly and downwardly from the top and bottom walls 13, 14 are mounting ears 17 each provided with tapped openings 18 to which the usual electrical double-receptacle unit is to be secured by mounting screws. The sidewalls and top and bottom walls of the receptacle box typically have a number of openings, as indicated generally at 18, strategically located to facilitate nailing or fastening of the receptacle box to stud members or portions of the building wall or to mounting straps which are in turn affixed to the building wall to support the receptacle box at the desired position. Also, knockouts, as indicated at 19, are provided at plural locations, usually along the rear wall 15, to provide circular openings through which wiring, armored cable or conduits can enter the box, with the ends of the wires then being left in exposed condition within the cavity 16 while the plasterer comes in to plaster over the walls on which the receptacle boxes are mounted. After the plastering is completed, the electrician then returns and installs the electrical receptacle units in the cavities 16 of the receptacle boxes, connecting the wire ends in the receptacle box to the mounting terminals of the receptacle unit, and then covering the box with the usual decorative face plate.

To deter the plasterer from plastering over the exposed receptacle box or troweling plaster into the cavity 16 of the receptacle box 10, I provide a removable protective cover, indicated at 20 in the drawing, formed of thin, relatively easily deformable sheet material, such as 24 gauge aluminum, having a rectangular center panel 21 bounded by upper and lower edges 22, 23 and vertical lateral edges 24, 25. The distance between the vertical lateral edges 24, 25 is sized to correspond substantially exactly to the distance between the confronting surfaces of the front edges of vertical sidewalls 11, 12 so that the rectangular center panel 21 of the cover 20 can nest between these vertical sidewalls 11, 12, while the distance between the upper and lower edges 22, 23 corresponds to the distance between the oppositely facing surfaces of the top and bottom walls 13, 14 so that the upper and lower edge portions of the center panel 21 rest on the forward edges of the top and bottom walls 13, 14. Typically, this panel 21 may be 1 3/16 inches wide and 3 inches high. Upwardly and downwardly projecting rounded formations 26, 27 extend respectively from the upper and lower edges 22, 23, for example, for about thirteen thirty-seconds inch each, to conform substantially to the shape of and completely cover the mounting ears 17 of the receptacle box. Readily bendable tabs 28 which may be one-eighth inch wide and one-quarter inch long and be spaced three thirty-seconds inch from the adjacent edge of the panel 21, extend oppositely laterally from these rounded ear-covering formations 26, 27 to be bent around and rearwardly lap the mounting ears 17 to retain the cover 20 in covering position over the opening of the receptacle box 10.

If the cover were to form a complete closure for the open front of the receptacle box, this would be unacceptable because the National Ethics Code Inspectors must be able to fully visually inspect the wires and the ground wire and the size of wires in the receptacle box after the electrician has completed the wiring but before the receptacle units are installed in the box. Therefore, the rectangular center panel 21 is so formed as to have outwardly bent vertical side flaps 29, 30 and top and bottom flaps 31, 32 extending perpendicularly outwardly from the center panel 21 to bound a large opening 33 in the center of the panel through which the inspector can visually inspect the wires in the receptacle box. These flaps 29–32 are located reasonably close to, for example about five-sixteenths inch from, the outer edges of the center panel 21 to form a baffle or stop projecting outwardly about one-half inch from panel 21, which will be engaged by the edge of the plasterer's trowel as the plasterer works to the edge of the box to prevent getting plaster inside the box. Also, the presence of the outwardly projecting flaps 29–32 forming a barrier about the perimeter of the opening 33 serves as a visual guide assisting the plasterer in stopping the trowel when it has only slightly overlapped the edge of the receptacle box, and extends far enough outwardly from the box to prevent completely covering the box over with plaster as had been done previously on many occasions.

After the plastering has been completed and the plaster has set, the electrician then returns to the job, and removes the cover by either pushing it inside or pulling it outside the receptacle to remove it in the manner which will not damage the plaster. In most cases, the electrician will merely push inwardly on the center portions of the center panel 21 in the region between the opening 33 and the lateral edges 24, 25 to collapse the cover into the receptacle cavity 16, which draws the upper and lower edges portions of the cover toward each other and forces the bent tabs 28 extending around the mounting ears 17 to open positions allowing the rounded ear covering formations 26, 27 to be withdrawn from over the mounting ears and permit the cover 20 to be manually withdrawn from the receptacle box. By bending the receptacle cover in its midportion inwardly into the open cavity in the receptacle box, any thin film of plaster which may have been formed over the front surface of the cover 20 along the lateral edges will be broken inwardly by shear action at the front edges of the vertical sidewalls 11 and provide a smooth break which will not require any subsequent pointing up by the plasterer.

It will be apparent, therefore, that the removable cover of the present invention can be simply and inexpensively made and can be readily installed over the open receptacle boxes by the electrician, permitting the plasterer to work up to the box while minimizing the possibility of any plaster getting inside the receptacle box, and which is still sufficiently open to permit proper inspection by the building inspectors. Also, the cover can be readily removed by the electrician without damage to the plaster after the plastering job is completed. It will be apparent that the covers can be stamped from flat sheet metal and left in flat condition for storage until ready for use by the electrician, when the electrician will then bend the flaps 29–32 outwardly to their proper perpendicular positions relative to the plane of the center panel 21 and then covers can be installed on the receptacle boxes by bending the tabs 28 rearwardly about mounting ears 17 of the receptacle boxes.

What is claimed as invention is:

1. A removable protective cover for use with an electrical receptacle box of the type having vertical sidewalls and top and bottom horizontal walls forming a forwardly opening cavity and the walls each having front edges adjacent a common vertical plane collectively defining a rectangular frame edge surrounding the opening to the cavity, and said horizontal walls respectively having mounting ears at their front edges projecting oppositely away from the center of said opening, the cover being adapted to be assembled to the receptacle box in covering relation to said opening to retard entry of plaster into the cavity during plastering after the receptacle box is mounted on a building wall, said cover comprising an integral body of deformable sheet material including a vertical elongated rectangular panel portion having longitudinal lateral edges spaced from each other to fit in said opening and lie immediately inwardly of the front edges of said vertical sidewalls and transverse horizontal edges at the upper and lower ends thereof spaced so that adjacent transverse edge portions of the cover lie against the front edges of said horizontal walls, and said cover including a pair of ear-covering integral extensions projecting in opposite directions from the transverse edges of said panel portion located and shaped to cover said mounting ears, the cover including integral bendable fastening means extending from opposite end portions thereof adjacent said transverse edges for releasably fastening the cover to the mounting ears of the receptacle box, and the lateral edge portions of the panel being unsupported along the length thereof whereby the midregions of the panel adjacent each of said lateral edges can be forcibly collapsed inwardly into the cavity of the associated receptacle box by a tool, causing the bendable fastening means to be forced to releasing positions relative to said mounting ears for manual removal of the cover from the receptacle box.

2. A removable protective cover for an electrical receptacle box as defined in claim 1, said rectangular panel portion having an opening over the major portion of the area thereof spaced from said lateral edges and said transverse edges, and said panel portion having integral outwardly projecting surfaces bounding said opening serving as stop surfaces to engage a plasterer's trowel approaching the central portion of the opening to the receptacle box cavity to retard movement of the trowel over the cavity opening.

3. A removable protective cover for an electrical receptacle box as defined in claim 1, wherein said integral fastening means comprises a pair of oppositely projecting bendable tabs extending laterally from opposite edges of each of said ear-covering extensions to be bent rearwardly around the adjacent mounting ear and at least partially underlap the rear surface thereof, and said bendable tabs being forced to open positions withdrawn from behind the associated mounting ear upon forcing of the midregions of the panel portion to inwardly collapsed condition within the cavity of the receptacle box.

4. A removable protective cover for an electrical receptacle box as defined in claim 2, wherein said integral fastening means comprises a pair of oppositely projecting bendable tabs extending laterally from opposite edges of each of said ear-covering extensions to be bent rearwardly around the adjacent mounting ear and at least partially underlap the rear surface thereof, and said bendable tabs being forced to open positions withdrawn from behind the associated mounting ear upon forcing of the midregions of the panel portion to inwardly collapsed condition within the cavity of the receptacle box.

5. A removable protective cover for an electrical receptacle box as defined in claim 1, wherein said panel portion has an opening over the major portion of the area thereof for visual inspection of the interior of the cavity by electrical inspectors, said opening being spaced from said longitudinal edges and said transverse edges, and said panel portion including integral flaps bent outwardly at substantially right angles to the plane of said panel portion bounding said opening at portions thereof adjacent each of said longitudinal and transverse edges to define stops to be engaged by a plasterer's trowel and prevent troweling over the front of the receptacle box.

6. A removable protective cover for an electrical receptacle box as defined in claim 3, wherein said panel portion has an opening over the major portion of the area thereof for visual inspection of the interior of the cavity by electrical inspectors, said opening being spaced from said longitudinal edges and said transverse edges, and said panel portion including integral flaps bent outwardly at substantially right angles to the plane of said panel portion bounding said opening at portions thereof adjacent each of said longitudinal and transverse edges to define stops to be engaged by a plasterer's trowel and prevent troweling over the front of the receptacle box.

7. A removable protective cover for an electrical receptacle box as defined in claim 5, wherein said opening in said panel portion is a rectangular opening defining a first pair of edges paralleling and located adjacent said longitudinal edges and the second pair of edges paralleling and located adjacent said transverse edges, and said flap defining first and second pairs of planiform flanges projecting perpendicularly outwardly from said panel portion at said first and second pairs of edges respectively.

8. A removable protective cover for an electrical receptacle box as defined in claim 6, wherein said opening in said panel portion is a rectangular opening defining a first pair of edges paralleling and located adjacent said longitudinal edges and the second pair of edges paralleling and located adjacent said transverse edges, and said flap defining first and second pairs of planiform flanges projecting perpendicularly outwardly from said panel portion at said first and second pairs of edges, respectively.